3,594,279
PROCESS FOR PRODUCING L-TRYPTOPHAN
Kiyoshi Nakayama, Sagamihara-shi, and Hiroshi Hagino, Hachioji-shi, Japan, assignors to Kyowa Hakko Kogyo Co., Ltd., Tokyo, Japan
No Drawing. Filed Jan. 23, 1969, Ser. No. 793,557
Claims priority, application Japan, Jan. 24, 1968, 43/3,715
Int. Cl. C12d *13/06*
U.S. Cl. 195—28                               11 Claims

ABSTRACT OF THE DISCLOSURE

L-tryptophan is produced by fermentation by a process which comprises culturing a histidine-requiring microorganism belonging to the genus Arthrobacter, Bacillus or Corynebacterium under aerobic conditions in an aqueous nutrient medium. Inexpensive carbohydrates or hydrocarbons can be used as the carbon source in the medium. The strains exemplified include *Arthrobacter paraffineus*, *Bacillus subtilis* and *Corynebacterium glutamicum*.

---

This invention relates to a process for producing L-tryptophan. More particularly, it relates to a process for the production of L-tryptophan by fermentation. Even more particularly, the invention relates to a process for producing L-tryptophan by fermentation by culturing histidine-requiring mutant strains in suitable fermentation media.

Processes for producing L-tryptophan by fermentation have been known in the art. These include, for example, the feature of adding indole or anthranilic acid to the culture medium (U.S. Pat. 2,999,051; Japanese patent publication 12,384/60; Japanese patent publication 4,632/64; French Pat. 1,437,998; and U.S. Pat. 3,293,141). However, the indole or anthranilic acid precursors used in these processes are expensive. Thus, these processes suffer the disadvantage that the cost of producing the tryptophan is high. Moreover, large quantities of these precursors cannot be used since they inhibit the growth of the microorganisms.

Accordingly, methods for producing L-tryptophan without adding precursors to the medium have been developed. These include, for example, a method wherein mutants of *Escherichia coli* are used [Journal of Fermentation Technology, vol. 43, No. 5, pp. 307–310 (1965)] and a method wherein a culture medium containing hydrocarbons as the source of carbon is employed. However, the yields obtained in these methods are low, especially in the latter method, ranging only about 1 mg./l.

Accordingly, one of the objects of the present invention is to provide an improved process for the production of L-tryptophan which overcomes the disadvantages and deficiencies of the prior art methods.

Another object of the present invention is to provide a process for producing L-tryptophan by fermentation which may be carried out in an efficacious and relatively simple manner.

A further object of the invention is to provide a process for producing L-tryptophan by fermentation which may be carried out advantageously on an industrial scale at low cost to give a high yield of product.

A still further object of the invention is to provide L-tryptophan.

These and other objects and advantages of the present invention will become apparent to those skilled in the art from a consideration of the following specification and claims.

As the result of various investigations on a microbiological method for making L-tryptophan from inexpensive hydrocarbons or carbohydrates without using precursors for the purpose of overcoming the defects of conventional methods, the present inventors have found, in accordance with the present invention, that mutant bacteria which require histidine for their growth and which belong to one of the genera Bacillus, Corynebacterium or Arthrobacter directly produce and accumulate significant amounts of L-tryptophan when cultured in an aqueous nutrient medium under aerobic conditions. Accordingly, it becomes possible to produce large yields of L-tryptophan at low cost by using inexpensive carbon sources such as carbohydrates, hydrocarbons, etc.

Suitable microorganisms to be used in the present invention are mutants of microorganisms belonging to the genera Bacillus, Corynebacterium and Arthrobacter which require at least histidine for their growth. Of course, mutants which require other substances besides histidine at the same time can be employed. These L-tryptophan-producing strains can easily be obtained by one skilled in the art by effecting a mutation treatment, such as ultraviolet ray irradiation, exposure to various radiations such as γ-rays or cobalt 60-rays, treatment with chemical agents or the like, and simultaneously employing an adequate selection method.

Either a synthetic culture medium or a natural nutrient medium is suitable for cultivation of the strains employed in the present invention as long as it contains the essential nutrients for the growth of the strain employed. Such nutrients are well known in the art and include substances such as a carbon source, a nitrogen source, inorganic compounds and the like which are utilized by the microorganism employed in appropriate amounts. Thus, as a carbon source, there may be mentioned, by way of example, carbohydrates such as glucose, fructose, maltose, sucrose, starch, starch hydrolysate, molasses, mannose, glycerol, etc., or any other suitable carbon source such as organic acids, for example, acetic acid, lactic acid, pyruvic acid, etc. These substances may be used either singly or in mixtures of two or more.

In the case of using hydrocarbon-assimilating microorganisms, hydrocarbons, for example, n-paraffins, kerosene or petroleum fractions including light oils, heavy oils, paraffin oils and the like may be used in the nutrient medium as the source of carbon, or in combination with a carbohydrate or a mixture of carbohydrates as the source of carbon.

As a nitrogen source, various kinds of inorganic or organic salts or compounds, such as urea, liquid ammonia or ammonium salts such as ammonium chloride, ammonium sulfate, ammonium nitrate, ammonium acetate, ammonium phosphate, ammonium carbonate, etc., or natural substances containing nitrogen, such as cornsteep liquor, yeast extract, meat extract, peptone, fish meal, bouillon, casein hydrolysates (like NZ-Amine), casamino acid, fish solubles, rice bran extract, defatted soybean cake, chrysalis hydrolysate, or various digestion substances thereof, etc. may be employed. Again, these substances may be used either singly or in combinations of two or more.

Inorganic compounds which may be added to the culture medium include magnesium sulfate, sodium phosphate, potassium dihydrogen phosphate, potassium monohydrogen phosphate, ferrous sulfate, manganese chloride, calcium chloride, sodium chloride, zinc sulfate, manganese sulfate, calcium carbonate, etc.

Of course, since the microorganisms suitably employed in the present invention require specific nutrients for their growth, the appropriate amounts of such nutrients should be added to the culture medium as required. These nutrients are ordinarily contained in the nitrogenous organic substances exemplified as nitrogen sources and, accordingly, such requirements are satisfied by using appropriate amounts of these substances. However, the nitrogenous organic substances may not necessarily be added to the medium for the purpose of supplying the required nutrient thereto. Hence, other growth factors, such as amino acids, vitamins such as thiamine, cobalamin, etc., or biotin may naturally be added to the medium.

Culturing is conducted under aerobic conditions, such as aerobic shaking of the culture or with aeration and agitation of a submerged culture, at a temperature of, for example, about 20° to 40° C. and at a pH of, for example, about 4.0 to 9.5. In order to obtain high yields of L-tryptophan, it is desirable to maintain the pH of the culture medium at approximately neutral (7.0). After about 2 to 5 days of culturing under these conditions, significant amounts of L-tryptophan are produced and accumulated in the resultant culture liquor.

After the completion of culturing, the microorganism cells are removed from the culture liquor and the L-tryptophan is recovered from the liquor by conventional means, such as ion exchange resin treatment, extraction with solvents, precipitation, adsorption, chromatography, concentration or the like. An especially suitable method is the ion exchange resin treatment described in Example 1 hereinbelow.

The following examples are given merely as illustrative of the present invention and are not to be considered as limiting. Unless otherwise noted, the percentages therein and throughout the application are by weight per liter of water. Exemplary microorganism strains advantageously employed in the present invention are described therein.

EXAMPLE 1

*Arthrobacter paraffineus* KY7112 ATCC 21333, a histidine-requiring mutant strain, is used as the seed microorganism. This strain is inoculated into a 250 ml.-conical flask containing 30 ml. of a culture medium (pH 7.4) containing 2% sorbitol, 1% meat extract, 0.5% yeast extract and 0.3% sodium chloride. Culturing is carried out with aerobic shaking at 30° C. for 24 hours in order to obtain a seed culture.

Two ml. of the resultant seed culture is inoculated into a 250 ml. conical flask containing 20 ml. of a fermentation medium (pH 7.4) having the following composition:

10%—sorbitol
2%—$NH_4Cl$
0.2%—$K_2HPO_4$
0.2%—$Na_2HPO_4$
0.1%—$MgSO_4 \cdot 7H_2O$
10 mg./l.—$FeSO_4 \cdot 7H_2O$
10 mg./l.—$MnSO_4 \cdot 4H_2O$
10 mg./l.—$ZnSO_4 \cdot 7H_2O$
5 mg./l.—thiamine hydrochloride
0.3%—yeast extract
1%—NZ-Amine
2%—$CaCO_3$ Culturing is then carried out with aerobic shaking of the culture in the fermentation medium at 30° C. for 4 days. As a result, the amount of L-tryptophan produced in the cultured liquor is 500 mg./l.

The resultant culture liquor is centrifuged in order to remove the microorganism cells therefrom. Five liters of the obtained supernatant liquid is passed through the strongly acidic cation exchange resin [Diaion SK 104 (H type)] in order to adsorb the L-tryptophan. After washing the column with water, the effluent obtained by eluting with 0.5 N ammonia water is concentrated to dryness and the resulting crude crystalline powder of tryptophan is dissolved into a small amount of a hot 50% ethanol-aqueous solution. It is then decolorized with active carbon and further cooled. Consequently, 1.5 grams of crystals of L-tryptophan is obtained.

EXAMPLE 2

The histidine-requiring mutant strain *Arthrobacter paraffineus* KY7112 ATCC 21333 is used as the seed microorganism. Culturing is carried out in the same manner and in the same media as described in Example 1, except that the fermentation medium contains 10% of kerosene instead of sorbitol as the carbon source. After four days of culturing, 400 mg./l. of L-tryptophan is accumulated in the resultant culture liquor.

EXAMPLE 3

*Bacillus subtilis* ATCC 14662 (a histidine, adenine, tyrosine and arginine-requiring mutant strain) is used as the seed microorganism. It is inoculated into a 250 ml. conical flask containing 30 ml. of a culture medium (pH 7.4) comprising 2% glucose, 1% yeast extract, 1% peptone and 0.25% sodium chloride. The strain is cultured with aerobic shaking at 30° C. for 24 hours in order to obtain a seed culture.

Two ml. of the resultant seed culture is inoculated into a 250 ml. conical flask containing 20 ml. of a fermentation medium having the following composition:

5%—glucose
0.05%—$K_2HPO_4$
0.05%—$KH_2PO_4$
1%—$(NH_4)_2SO_4$
0.025%—$MgSO_4 \cdot 7H_2O$
30 µg/l.—biotin
0.1%—yeast extract
0.25%—NZ-Amine
2%—$CaCO_3$ The pH of the fermentation medium is 7.4.

Culturing is carried out with aerobic shaking of the culture at 30° C. for four days. As a result, 200 mg./l. of L-tryptophan is found to be produced in the resultant culture liquor.

EXAMPLE 4

*Corynebacterium glutamicum* KY9104 ATCC 21334, a histidine-requiring mutant strain, is used as the seed microorganism. Culturing is conducted in the same manner and in the same media as described in Example 3. As a result, the amount of L-tryptophan produced in the cultured liquor is 500 mg./l.

The invention being thus described, it will be obvious that the same may be varied in many ways. Such variations are not to be regarded as a departure from the spirit and scope of the invention, and all such modifications as would be obvious to one skilled in the art are intended to be included herein.

We claim:

1. A process for producing L-tryptophan which comprises culturing a histidine-requiring microorganism belonging to a genus selected from the group consisting of Corynebacterium, Arthrobacter and Bacillus and which is capable of producing L-tryptophan under aerobic conditions in an aqueous nutrient medium containing a carbon source and histidine, accumulating L-tryptophan in the resultant culture liquor and recovering the L-tryptophan from the culture liquor.

2. The process of claim 1, wherein culturing is carried out at a temperature of about 20° to 40° C. and at a pH of about 4.0 to 9.5.

3. The process of claim 1, wherein said nutrient medium contains at least one carbohydrate as the source of carbon.

4. The process of claim 1, wherein said nutrient medium contains at least one hydrocarbon as the source of carbon.

5. A process for producing L-tryptophan which comprises culturing a histidine-requiring microorganism belonging to a genus selected from the group consisting of Corynebacterium, Arthrobacter and Bacillus and which is capable of producing L-tryptophan under aerobic conditions in an aqueous nutrient medium containing a carbon source and histidine at a temperature of about 20° to 40° C. and at a pH of about 4.0 to 9.5, and accumulating L-tryptophan in the resultant culture liquor and recovering the L-tryptophan from the culture liquor.

6. The process of claim 5, wherein the pH is maintained at around 7 during culturing.

7. The process of claim 5, wherein said microorganism is *Arthrobacter paraffineus* ATCC 21333.

8. The process of claim 5, wherein said microorganism is *Bacillus subtilis* ATCC 14662.

9. The process of claim 5, wherein said microorganism is *Corynebacterium glutamicum* ATCC 21334.

10. The process of claim 7, wherein said nutrient medium contains a carbohydrate or kerosene as the source of carbon.

11. The process of claim 5, wherein the L-tryptophan is recovered from the resultant culture liquor by means of an ion exchange resin treatment.

References Cited

UNITED STATES PATENTS 3,133,868   5/1964   Takesue et al. _____ 195—30

ALVIN E. TANENHOLTZ, Primary Examiner

R. M. ELLIOTT, Assistant Examiner

U.S. Cl. X.R.

195—29, 47